(12) United States Patent
Pauget et al.

(10) Patent No.: US 11,163,079 B2
(45) Date of Patent: Nov. 2, 2021

(54) METHOD FOR PRODUCING A GEOLOGICAL VECTOR MODEL

(71) Applicant: ELIIS, Clapiers (FR)

(72) Inventors: Fabien Pauget, Prades le Lez (FR); Sebastien Lacaze, Carnon Plage (FR)

(73) Assignee: ELLIS, Clapiers (FR)

( * ) Notice: Subject to any disclaimer, the term of this patent is extended or adjusted under 35 U.S.C. 154(b) by 347 days.

(21) Appl. No.: 16/341,879

(22) PCT Filed: Oct. 5, 2017

(86) PCT No.: PCT/FR2017/000184
§ 371 (c)(1),
(2) Date: Apr. 12, 2019

(87) PCT Pub. No.: WO2018/065684
PCT Pub. Date: Apr. 12, 2018

(65) Prior Publication Data
US 2021/0293982 A1    Sep. 23, 2021

(30) Foreign Application Priority Data
Oct. 7, 2016  (FR) .................................... 16 59725

(51) Int. Cl.
*G01V 1/28* (2006.01)
*G01V 1/30* (2006.01)

(52) U.S. Cl.
CPC ............... *G01V 1/282* (2013.01); *G01V 1/30* (2013.01); *G01V 2210/642* (2013.01); *G01V 2210/66* (2013.01)

(58) Field of Classification Search
USPC .......................................................... 703/6
See application file for complete search history.

(56) References Cited

U.S. PATENT DOCUMENTS 8,315,845 B2   11/2012  Lepage
8,711,140 B1   4/2014   Mallet
(Continued)

FOREIGN PATENT DOCUMENTS

EP    2631685 A2    8/2013
FR    2939520 A1    6/2010
WO    2014124204 A1  8/2014

OTHER PUBLICATIONS

R.Gubta et al. "Automated geomodelling a Nigeria case study", 70th EAGE Conference & Exhibition—Rome, Italy, Jun. 9, 2008, pp. 1-5, XP002771882, p. 3.
(Continued)

*Primary Examiner* — Paul D Lee
(74) *Attorney, Agent, or Firm* — Craft Chu PLLC; Andrew W. Chu

(57) ABSTRACT

The method for producing a geological vector model (GVM) based on seismic data includes the step of forming a Model-Grid, which includes creating a network of small units, called patches, to which a relative geological age is assigned, a set of patches with the same relative geological age corresponding to a geological layer, called the geological horizon. The method includes the step of sampling the Model-Grid in two directions perpendicular to each other, enabling the Model-Grid to be sampled in a plurality of vertical planes and the step of forming two-dimensional geological vector models (2DGVM). The step of forming includes forming two-dimensional horizons (Hb) with distinct relative geological ages using the patches belonging to each sampled plane, each two-dimensional geological vector model (2DGVM) corresponding to a vertical plane originating from the sampling of the Model-Grid.

14 Claims, 7 Drawing Sheets

(a)

(b)

(56) References Cited

U.S. PATENT DOCUMENTS

| | | | |
|---|---|---|---|
| 2011/0002194 A1 | 1/2011 | Imhof | |
| 2012/0029828 A1 | 2/2012 | Pepper | |
| 2013/0151161 A1* | 6/2013 | Imhof | G06F 17/00 702/14 |
| 2013/0262052 A1* | 10/2013 | Mallet | G01V 1/302 703/2 |
| 2014/0222403 A1* | 8/2014 | Lepage | G01V 99/005 703/6 |
| 2016/0370482 A1* | 12/2016 | Mallet | G01V 1/345 |

OTHER PUBLICATIONS

Fabien Pauget, Sébastien Lacaze, Thomas Valding "A global approach in seismic interpretation based on cost function minimization" SEG Technical Program Expanded Abstracts 2009, Jan. 1, 2009, Society of Exploration Geophysicists, Jan. 1, 2009, pp. 2592-2596, https://dx.doi.org/10.1190/1.3255384, XP055389076.

Jack Hoyes, Chebet Thibaut "A review of "global" interpretation methods for automated 3D horizon picking" The leading Edge, Jan. 1, 2011, SEG, Jan. 1, 2011, pp. 39-47, XP055103790.

* cited by examiner

METHOD FOR PRODUCING A GEOLOGICAL VECTOR MODEL

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The invention relates to the field of subterranean analyses, and particularly the analysis of seismic data obtained by acoustic profiling.

More specifically, the invention relates to a method of producing a geological vector model making it possible to model in a simplified way the geological layers, also called geological horizons, from seismic data.

2. Description of Related Art Including Information Disclosed Under 37 CFR 1.97 and 37 CFR 1.98

Seismic data are a two-dimensional or three-dimensional image of the subsurface obtained by acoustic surveying and recording. Preferably, these surveys are performed with source of vibration, for example a compressed air cannon for marine acquisition or a vibrator truck for acquisition on land.

The seismic data are formed by vertical planes resulting from the survey of the subsurface, produced by moving the vibrational source back and forth along lines parallel to each other in a geographical area of interest. Each pulse allows the recording of a seismic trace, the movement in one direction allows the recording of a plane corresponding to a seismic section, and the movement back and forth forms a volume.

These surveys are based on the principle of formation of subterranean areas by the deposition of a geological layer at a specific time. Thus, when the acoustic wave travels through a subsurface area, at each change of nature of the subsurface the acoustic wave undergoes a transformation of its signal which makes it possible to identify a position of each geological layer.

Seismic data are very difficult to interpret because they are noisy and voluminous, due to their internal structure formed by geological horizons intermingled with faulting, in the form of acoustic signals.

For example, the magnitude of subsurface areas to be interpreted involve seismic data taken over several hundred square kilometers and over several kilometers of depth.

The benefit of interpretation of seismic data, particularly within the scope of prospecting for new petroleum deposits, has led to the development of methods of obtaining geological vector models.

A geological vector model is a more or less accurate simplified representation in two or three dimensions of the internal structure of the subsurface.

Currently, there are several methods of producing a geological vector model, and particularly cellular geological vector models. These have a geology that is cut into small cells, each cell having properties calculated on the basis of their seismic signature relative to porosity, compaction, etc. This cellular modeling finds particular application in simulating the behavior of petroleum reservoirs before and after drilling, which makes it possible to optimize the positioning of new wells.

In general, these model producing methods comprise a first step of obtaining horizons, a second step of obtaining faults, a third step of refining geological relationships between the horizons in the faults, and finally a last step of two-dimensional and/or three-dimensional vectoring.

Generally, the step of obtaining horizons is performed either by manual pointing or by obtaining them semi-automatically. Depending on the technique used, the horizons are then interpolated to obtain a complete surface; the propagation, which is erratic and often a source of errors, must be controlled and corrected manually.

Irrespective of the technique used, obtaining horizons is never exhaustive, the most complex horizons are not integrated, and the geological vector models resulting therefrom lack precision [because they] need a sufficient number of integrated horizons.

In general, a horizon corresponds to a geological layer resulting from a sedimentary deposit produced at a given geological time. The result is that two horizons pertaining to a realistic geological model cannot intersect.

In this context, in order to produce a realistic geological vector model, it is essential to verify that the horizons do not intersect in order not to create a geological artifact. Thus, for 100 horizons obtained, 4950 operations to verify non-intersection must be performed, before obtaining a set of horizons enabling a geological vector model to be produced.

The number 4950 corresponds to the number of possible combinations taking a pair of two horizons among 100 available horizons; to calculate it, the following formula is used:

$$C_n^k = \frac{n!}{k!(n-k)!} \text{ with } k = 2 \text{ and } n = 100$$

Furthermore, when a geological artifact is detected, it must be corrected manually, thus adding additional human effort.

In the same way, the step of obtaining faults can be done by manual pointing, which consists of defining the fault in forms of lines over several consecutive seismic sections. These lines are then interpolated to construct the fault plane.

There are also automatic techniques for obtaining faults, but which are not sufficiently precise, and which generate an incomplete fault plane requiring tedious manual correction.

The step of refining the geological relationships between the horizons and the faults consists of adjusting the horizons/faults contacts by modifying each horizon at the approaches of the fault planes in order to obtain a realistic geology. The precision of the geological vector model depends on the precision of the adjustment of the horizons/faults contacts. Thus, for 100 horizons and 300 faults obtained, 100*300 or 30,000 horizon-fault adjustment operations must be made. Of course, there are software programs that make it possible to optimize this adjustment step, but each modified horizon/fault contact must undergo a control operation performed by a human operator.

The step of two-dimensional and/or three-dimensional vectoring makes it possible to generate a geological vector model by assembling, for example, the horizons and the faults in the form of two-dimensional or three-dimensional cells.

It can be seen from these observations—irrespective of the technique used, manual or a semi-automatic—that the steps of obtaining horizons, obtaining faults and refining geological relationships between the horizons and the faults requires a large number of human interventions, which makes the steps long, laborious and therefore expensive for any companies performing these operations of processing seismic data.

In order to resolve these problems, methods of producing a geological vector model have been developed. In this context, the most recent solutions described by documents U.S. Pat. No. 8,315,845, EP 2,631,685, U.S. Pat. No. 8,711,140 and WO 2014/124204, use functions for transforming seismic space to geological space, allowing the relationships to be simplified between the horizons and the faults integrated in the interpretation of the seismic data.

For example, a step of flattening each horizon by its geological age makes it possible to obviate all deformations undergone by the horizons over time and to simplify the step of refining the geological relationships between the horizons and the faults. Thus, once the horizons/faults contacts have been adjusted in flattened space, the horizons and faults undergo a reverse transformation to form a realistic geological vector model.

Although they improve the step of refining geological relationships between the horizons and the faults, these methods of producing geological vector models of horizons do not include a step of obtaining horizons and faulting, which are always subject to the aforementioned disadvantages. Moreover, a problem of conformities of the implemented objects, for example an intersection between two horizons, can lead to a failure in producing the geological vector model.

BRIEF SUMMARY OF THE INVENTION

In this context, the invention offers a solution to resolve the aforementioned problems of the prior art by providing a method of producing a geological model that is fast and simple to implement, and which integrates the creation of horizons.

To that end, the invention concerns a method of producing a geological vector model from seismic data.

The said method is characterized in that it comprises a step of forming a Model-Grid, which consists of creating a network of small units called patches to which are assigned a relative geological age, a set of patches of the same relative geological age corresponding to a geological layer called geological horizon.

Integrating the formation of the Model-Grid in the method of producing a geological vector model of the invention makes it possible to incorporate an automatic acquisition of horizons, integrating faulting as a constraint.

The said method is also characterized in that it comprises a step of sampling the Model-Grid in two directions perpendicular to each other, enabling the Model-Grid to be sampled in a plurality of vertical planes.

The sampling of the Model-Grid makes it possible to adjust the precision of the geological vector model by varying the number of vertical planes that are used to form the geological vector model. This approach allows a compromise to be found between the precision of the vector model to be obtained and the speed with which it is obtained, by taking into account the capacity of the available data processing means.

The said production method is further characterized in that it comprises a step of forming two-dimensional geological vector models that consist of forming two-dimensional horizons of distinct relative geological ages by using the patches pertaining to each sampled plane, each two-dimensional geological vector model corresponding to a vertical plane originating from the sampling of the Model-Grid.

The step of producing two-dimensional geological vector models is of particular benefit for the formation of a two-dimensional geological horizon that ensures intelligible modeling of a vertical plane from seismic data, thus furnishing geologists with a precise and easily interpreted tool.

According to one feature of the invention, the sampling step consists of sequencing the Model-Grid in a multitude of vertical planes according to one sampling parameter corresponding to a distance defined in geological pixels, the Model-Grid being sampled along two directions, an Inline direction perpendicular to a Crossline direction.

According to an additional characteristic of the invention, the production method comprises a step of synchronizing two-dimensional geological models which consists of connecting the two-dimensional geological horizons of the same relative geological age, belonging to each two-dimensional geological model so as to form N three-dimensional geological horizons connected to each other in order to form a three-dimensional geological vector model.

The benefit of said step of assembling two-dimensional geological models is the formation of three-dimensional geological models that make it possible to model a complete sedimentary basin.

Furthermore, the step of synchronizing N three-dimensional geological horizons comprises a step of interconnecting each three-dimensional geological horizon through a step of creating a two-dimensional cell surface fill pattern forming the three-dimensional geological horizon.

The step of synchronizing N three-dimensional geological horizons is of particular interest in that it allows a geologist to assign physical petroleum properties of rock that are specific to each three-dimensional geological horizon. This possibility allows geologists to facilitate their prospecting in order to produce new oil or gas wells.

To those ends, the step of synchronizing N three-dimensional geological horizons comprises a step of three-dimensional cell creation by association of two two-dimensional cells which belong to two three-dimensional geological horizons of consecutive relative geological ages, the two two-dimensional cells being superimposed upon each other and connected by four lateral faces, each lateral face corresponding to an Inline or Crossline plane.

Moreover, the step of synchronizing N three-dimensional geological horizons comprises a step of creating a lateral surface fill pattern of each lateral face.

In order to obtain a cellular three-dimensional geological vector model, the step of synchronizing N three-dimensional geological horizons comprises a step of creating a volumetric fill pattern of each three-dimensional cell by association of common points between the surface fill patterns of the two two-dimensional cells and the lateral surface fill patterns of each lateral face.

This step of synchronizing N three-dimensional geological horizons and the creation of a volumetric fill pattern of each three-dimensional cell is part of a procedure for refining the precision of the three-dimensional geological vector model obtained. Indeed, geologists exploit these characteristics, for example by assigning physical petroleum properties of rock to each three-dimensional cell that comprises the three-dimensional geological vector model, thus increasing the precision of prospecting.

According to one characteristic of the invention, the step of forming the Model-Grid comprises the following steps:
 a step of sampling seismic data in such a way as to isolate each seismic trace;
 a step of determining a center of each patch by identification of minimums and maximums of seismic signals that comprise each seismic trace, a patch center corresponding to a small geological horizon;
 a step of creating vertical and lateral links between each patch center;
 a step of lateral propagation from the center of each patch so as to form a patch network; and
 a step of assigning a relative geological age to each patch by using the vertical and lateral links from each patch center.

The step of forming the Model-Grid is a key step in the method of producing a geological vector model of the invention. Indeed, this step has the advantage of creating automatically, quickly and at minimal cost the horizons of the desired geological vector model by integrating faulting into the construction of these horizons. Thus, the Model-Grid provides a set of data in which the horizons that are formed from patches cannot intersect another horizon nor can they intersect a fault. These properties have the advantage of providing objects suitable for the formation of a geological vector model and thus avoid any failure in modeling.

In this regard, the step of assigning a relative geological age is achieved by superposition and comprises a step of verifying the relative geological age, consisting of verifying, on the same seismic trace, that a higher patch does not have a higher relative geological age compared to the patch located below.

Advantageously, this step of assigning a relative geological age is the basis of a fundamental property of the Model-Grid, namely that one horizon never intersects another horizon.

With respect to the step of lateral propagation from the center of each patch, it is done by associating with each patch center points of seismic data the geological signature of which is identical to that of the center of the patch, each patch center not extending beyond a point located on a fault segment.

Advantageously, this propagation step is the basis for another fundamental property of the Model-Grid, namely that a horizon formed by a set of patches never intersects a fault.

According to an additional characteristic, the step of forming two-dimensional geological vector models comprises:
 a weighted interpolation step making it possible to create N geological horizons in which faulting is inserted;
 an automatic adjustment step between the N geological horizons and the faulting, so as to adjust the contacts between each geological horizon and each fault present in the two-dimensional geological model;
 the steps of weighted interpolation and automatic adjustment being repeated in two directions perpendicular to each other so as to obtain a multitude of two-dimensional geological models by sequencing of the Model-Grid.

Advantageously, the weighted interpolation step makes it possible not only to do without any intervention by a human operator but also to obtain horizons that do not intersect each other and do not intersect faults beyond the precision of the geological pixel, which is not possible with the conventional methods of obtaining horizons.

The step of weighted interpolation of horizons also has the advantage of directly and automatically integrating, the insertion of the faulting in the network of patches of the Model-Grid consists in generating in proximity to the fault a discontinuity in the geological horizon, each discontinuity being of similar dimensions.

Advantageously, the step of weighted interpolation to create geological horizons has a precision beyond the geological pixel, the weighted interpolation of positions corresponding to a relative geological age while using the fault as constraint.

Moreover, the step of automatic adjustment between the N geological horizons and the faulting consists of extending by several geological pixels one end of a geological horizon to the closest fault.

BRIEF DESCRIPTION OF THE SEVERAL VIEWS OF THE DRAWINGS

Other characteristics and advantages will be seen in the detailed description that follows, of one non-limiting embodiment of the invention, and illustrated by the appended drawings 1 to 20.

FIG. 5*a* is a representation of a step of lateral propagation from each patch center.

FIG. 5b is a three-dimensional representation of the patches obtained following the propagation step illustrated in FIG. 5a.

FIG. 10a is a representation of seismic data.

FIG. 10b is a representation of a two-dimensional geological model produced with the aid of the method of the invention and resulting from the seismic data of FIG. 10a.

DETAILED DESCRIPTION OF THE INVENTION

The invention concerns an improved method of producing a geological vector model GVM from seismic data.

It will be recalled that seismic data 1 correspond to a two-dimensional or three-dimensional seismic image. Each two-dimensional seismic image corresponds to a vertical plane and a three-dimensional seismic image is composed of vertical planes parallel to each other. Each vertical plane corresponds to a seismic section composed of seismic trace Tr which corresponds to a recording of a vertical line of seismic data. Each seismic trace Tr is composed of geological pixels stacked one upon another.

The method of producing a geological vector model GVM according to the invention comprises a plurality of steps each sequenced in one or more steps that can be classified as sub-steps. Preferably, said steps are implemented by data processing means, such as for example a computer executing one or more algorithms corresponding to a step of the method of producing a geological vector model.

In this context, the method of producing a geological vector model GVM comprises a step of producing a Model-Grid 2 which corresponds to a transformation of seismic data 1 in the form of a network of small units stacked vertically and called patches 3.

The patches 3 are organized along vertical planes, the Model-Grid 2 being constructed so as to follow the deposition logic of the geological horizons H. In this context, in order to organize the patches 2 vertically, a relative geological age V is assigned to each patch 2. The result is that a set of patches 2 of the same relative geological age V corresponds to a geological horizon H. With a view to forming the Model-Grid 2, the method of producing a geological vector model uses the properties of the seismic data 1.

Figure 1:
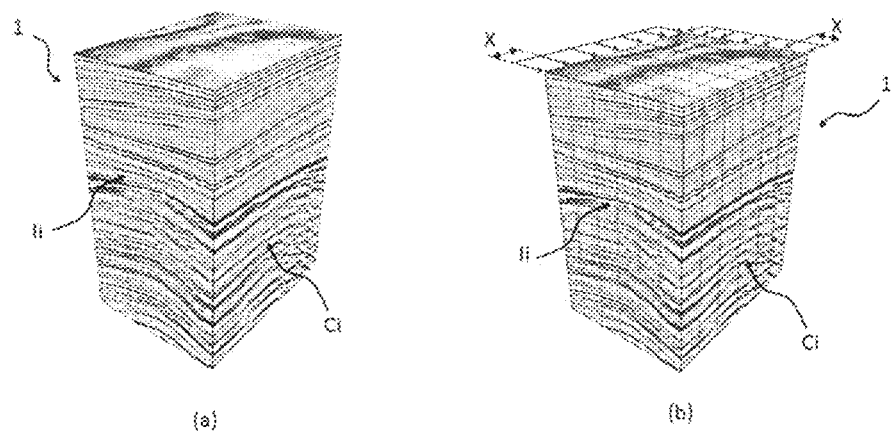
FIG. 1*a* is a representation of seismic data in the form of a three-dimensional seismic image.
FIG. 1*b* is a representation of a step of sampling seismic data according to a sampling pitch of X.
Figure 2:
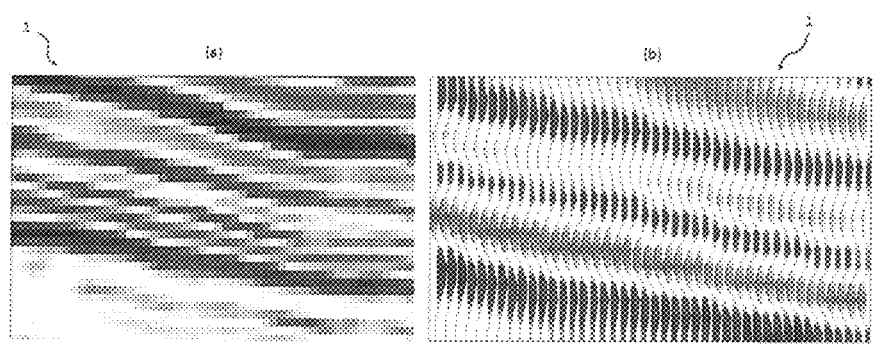
FIG. 2*a* is a representation in pixels of a two-dimensional seismic image.
FIG. 2*b* is a representation in continuous signals of a two-dimensional seismic image.

Thus, as illustrated in FIGS. 1a and 1b, the three-dimensional seismic images are volumetric seismic data 1, which can be sequenced according to two families of vertical planes. Indeed, each plane of a three-dimensional seismic image constitutes a two-dimensional seismic image that can be represented in the form of pixels (illustrated in FIG. 2a), but also in the form of a continuous signal (illustrated in FIG. 2b).

A first plane family corresponds to the vertical planes of each seismic section established along the direction of recording of the seismic data 1, which is called an Inline Ii plane. A second plane family called Crossline planes CI, corresponds to the vertical planes in a direction perpendicular to the Inline planes Ii.

Hereinafter, the expressions Inlines Ii and Crosslines Ci are used to designate the respective planes as described above.

Figure 3:
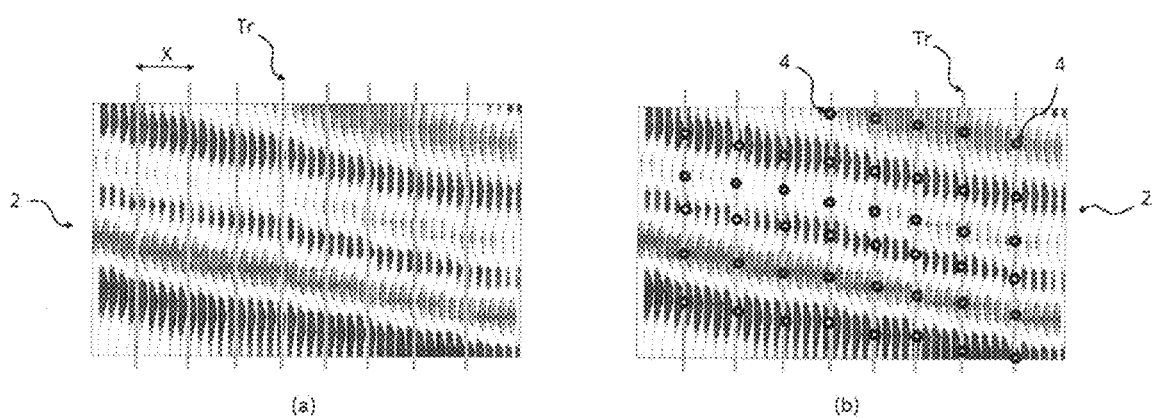
FIG. 3*a* is a representation of a sampling step within the two-dimensional seismic image of FIG. 2*b*.
FIG. 3*b* is a representation of a step of identifying patch centers within a two-dimensional seismic image of FIG. 2*b*.

In the example illustrated in FIGS. 1b and 3a, the step of producing the Model-Grid 2 uses the sequencing properties of the Inlines Ii and Crosslines Ci in a step of sampling seismic data 1 as a function of a sampling pitch X in geological pixels Px. More particularly, the sampling step consists of selecting one seismic trace Tr every X pixels Px in both directions Inline Ii and Crossline Ci.

Advantageously, said sampling technique represents a first level of control and adaptation of the precision of obtaining the Model-Grid 2. Indeed, by varying the sampling pitch X it is possible to adapt the precision of the Model-Grid 2. For example, in the particular case illustrated in FIG. 1b, for seismic data 1 it is possible to sample according to a sampling pitch X=1. Here, all the seismic traces Tr forming the seismic data 1 are taken into account so as to form a Model-Grid 2 which will be more accurate. In practice, the sampling pitch X is defined based on the dimensions of the seismic data 1 and of the capacity of the data processing means.

As illustrated in FIG. 3b, the step of producing the Model-Grid 2 comprises a step of determining a center 4 of each patch 3. To that end, the properties of the seismic signal are used to determine each center 4 of patch 3. It should be remembered that a seismic signal corresponds to a periodic signal comprising minimums and maximums. In the present case, it is these minimums and maximums of the seismic signals that are identified as the center 4 of a patch 3 on each seismic trace Tr. Each identification results in the creation of a center 4 of patch 3 which corresponds to a small geological horizon.

Figure 4:
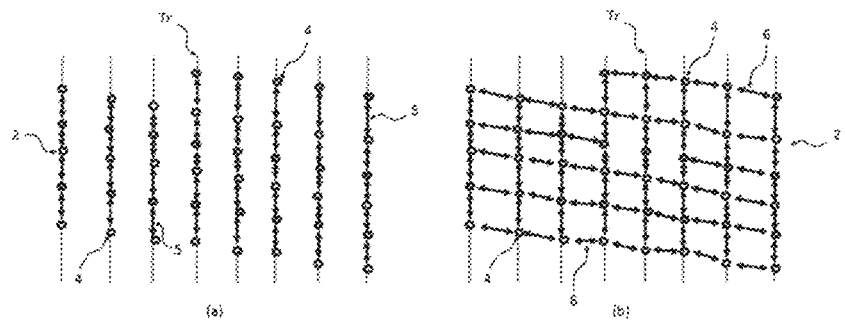
FIG. 4*a* is a representation of a step of creating vertical links between the patch centers of the same seismic section.
FIG. 4*b* is a representation of a step of creating lateral links between the patch centers of the same seismic section.

In the example illustrated in FIGS. 4a and 4b, the step of producing the Model-Grid 2 comprises a step of creating vertical links 5 and lateral links 6 between each center 4 of patch 3. The creation of vertical links 5 consists of modeling a stratigraphic relationship between each patch 3 stacked vertically on the same seismic trace Tr (illustrated in FIG. 4a). In parallel, the creation of lateral links 5 consists of creating a lateral virtual link between all the centers 4 of patch 3 having a similar seismic signal (illustrated in FIG. 4b). Thus, all the patches 3 linked together laterally correspond to one geological horizon H.

Figure 5:
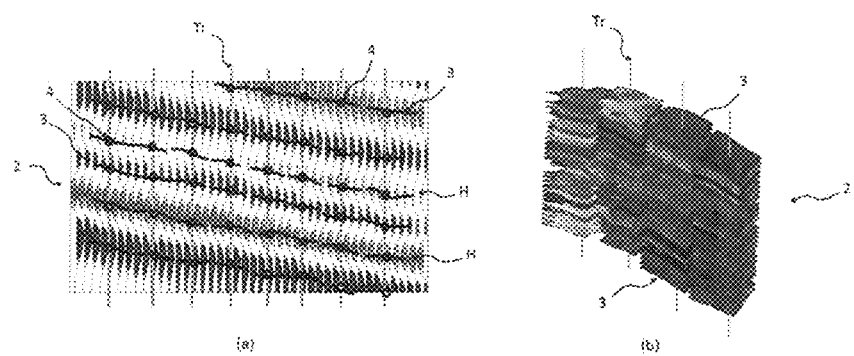

In the example illustrated in FIGS. 5a and 5b, the step of producing the Model-Grid 2 comprises a step of lateral propagation from the center 4 of each patch 3 so as to form a patch assembly 3 (illustrated in FIG. 5b). For that purpose, the lateral propagation from the center 4 of each patch 3 is done by association of points from the seismic data 1. Thus, the points of seismic signal similar to the one from a center 4 of a specific patch 3 are associated with said center 4 patch 3. Advantageously, each center 4 of patch 3 is not propagated beyond a point located on a fault 8. This characteristic participates in defining one of the major properties of the Model-Grid 2, namely that geological horizons H never intersect the faults 8.

Figure 6:
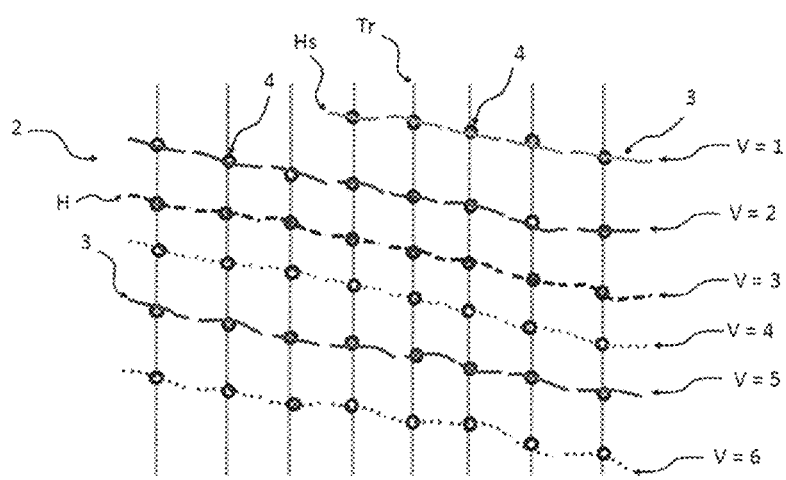
FIG. 6 is a representation of a step of assigning a relative age to each patch, thus forming a Model-Grid composed of a network of small units called patches to which relative geological ages are assigned.

In the example illustrated in FIG. 6, the step of producing the Model-Grid 2 comprises a step of assigning a relative geological age V to each patch 3. Said relative geological age V of a patch 3 is as early as the geological horizon H to which the patch 3 belongs is recent. In order to preserve the stratigraphic validity of the deposition of the geological horizons H, the method uses the vertical links 5 and lateral links 6 of each center 4 of a patch 3 so as to assign by superposition a relative geological age V to each patch 3. In the present example, an arbitrary relative geological age Vn is assigned to a laterally linked patch 3 assembly. By using the vertical links 6, a first patch lower than the relative geological age patch Vn is assigned a relative geological age Vn+1, incremented by one unit. Conversely, by using the vertical links 6 a first patch higher than the relative geological age patch Vn is assigned a relative geological age patch Vn−1, decreased by one unit. This technique of assigning a relative geological age V makes it possible to obtain geological horizons H having a relative geological age V increasing when a seismic trace Tr runs from a higher geological horizon Hs toward lower geological horizons H (illustrated in FIG. 6).

Advantageously, in order to avoid any error during this step of assigning a relative geological age V, the method comprises a step of verifying the geological age V. The verification step consists of verifying that the patches 3 located on a same seismic trace Tr are chronologically superimposed without inversion of relative geological age V.

In general, the Model-Grid 2 is a simplified representation of the seismic data 1. The Model-Grid is presented in the form of patches 3 stacked vertically and organized in the form of planes corresponding to the Inlines Ii and Crosslines Ci of the sampled seismic data 1. Furthermore, the Model-Grid 2 is constructed in such a way as to respect the logic of deposition of the geological horizons H over time. The result is that the patches 3 belonging to the same geological horizon H are assigned the same relative geological age V and the geological horizons H do not intersect.

Figure 11:
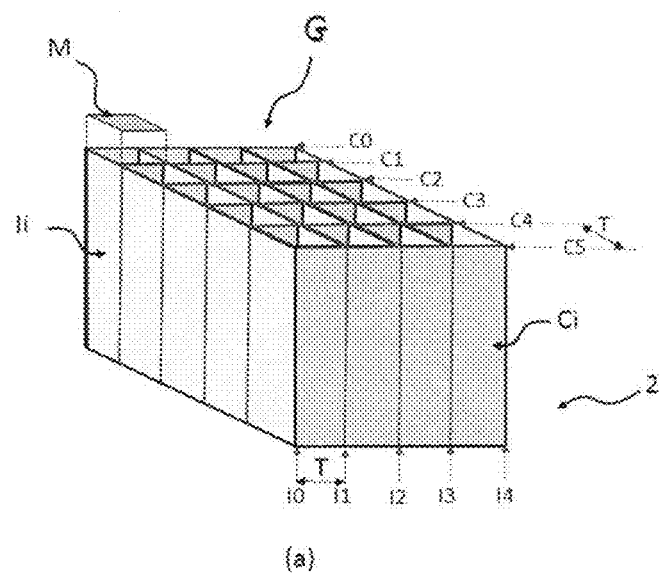
FIG. 11 is a representation of a sampling step of the Model-Grid along two directions perpendicular to each other.

In the example illustrated in FIG. 11, the method of producing a geological vector model comprises a step of sampling of the Model-Grid 2 in a multitude of vertical planes along both directions Inline Ii and Crossline Ci. The sampling step comprises a step of defining a sampling parameter T of the Model-Grid 2 that corresponds with a distance defined in geological pixels Px between two consecutive Inlines Ii and two consecutive Crosslines Ci. The sampling of the Model-Grid 2 also comprises a step of collection of all the Inlines Ii and all the Crosslines Ci separated from the previously defined parameter T.

Advantageously, this sampling step makes it possible to obtain a two-dimensional sampling grid G in which the Inlines are numbered I0, I1, I2 . . . INBL−1 and the Crosslines C0, C1, C2 . . . CNBC−1 with NBL and NBC being respectively the number of Inlines Ii and the number of Crosslines Ci.

The step of sampling the Model-Grid 2 constitutes a second level of control and adaptation of the precision of modeling of a geological vector model GVM according to the method of the invention. Indeed, by varying the sampling parameter T based on the size of seismic data 1 to be modeled and the technical data processing means available, it is possible to adapt the precision of a geological vector model GVM produced by the method of the invention.

In one particular example, when the sampling parameter T is defined as T=1, the collection step that follows will collect all the Inlines Ii and Crosslines Ci that constitute the Model-Grid 2. The result is a geological vector model GVM that will be all the more precise.

The method of producing a geological vector model GVM comprises a step of forming two-dimensional geological vector models 2DGVM, each two-dimensional geological vector model 2DGVM corresponding, on the one hand, to N two-dimensional horizons Hb of distinct relative geological ages and belonging to an Inline Ii plane or Crossline Ci plane, and on the other hand to intersections between the Inline Ii or Crossline Ci planes and the faulting, collected during the step of sampling the Model-Grid 2.

Figure 7:
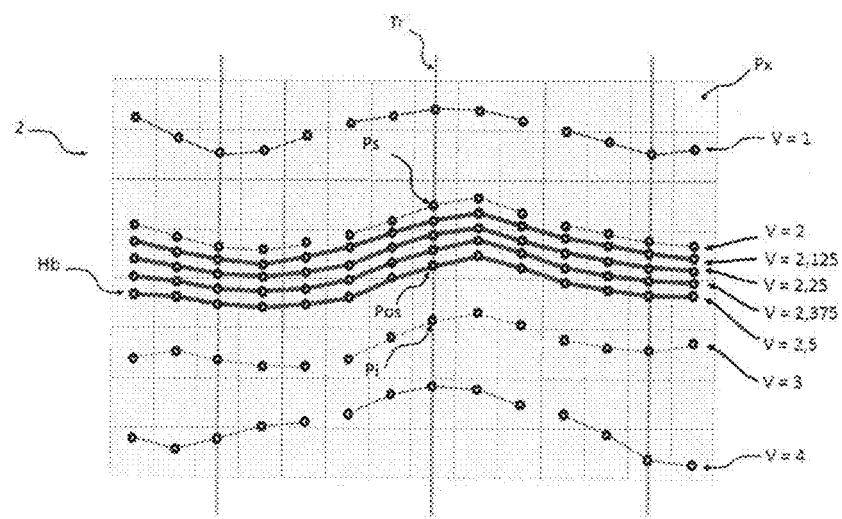
FIG. 7 is a representation of a step of weighted interpolation enabling the creation of N horizons.

As illustrated in FIG. 7, the step of forming two-dimensional geological vector models 2DGVM comprises a step of weighted interpolation enabling N horizons to be created and thus increasing the precision of the Model-Grid 2 beyond the geological pixel Px.

For those purposes, the step of weighted interpolation comprises a step of defining a target relative geological age V in order to generate a two-dimensional horizon Hb corresponding to said target relative geological age V.

The step of weighted interpolation is followed by a step of determining by weighted interpolation of a position Pos in the Model-Grid 2 corresponding to the target relative geological age V on each seismic trace Tr.

Firstly, to determine the position Pos, all the patches intersecting a defined seismic trace Tr are identified, the intersection between a patch and a seismic trace Tr corresponding to one point (illustrated in FIG. 7).

Secondly, among all the patches previously identified, the patches 3 directly above and below are identified for which the relative geological ages respectively provide the limits to the value V. To that end, the seismic trace Tr is surveyed from top to bottom from the upper horizon Hs. Such a survey makes it possible to identify, on the one hand, the upper patch of position Ps that corresponds to the first patch for which the relative geological age Vs is less than V, and on the other hand, the lower patch 3 of position Pi which is located below in the immediate vicinity of the upper patch of position Ps and the relative geological age of which is Vi, greater than the relative geological age V. In this context, the position Pos is determined by an interpolation of the positions Ps and Pi weighted by the relative geological ages Vs and Vi according to the following formula.

$$Pos = Ps + \frac{V - Vs}{(Vi - Vs)(Pi - Ps)}$$

A particular case of determination of a position Pos is illustrated in FIG. 7; here, the desired position Pos comprises a relative geological age V=2.5. Accordingly, the survey of the seismic trace Tr from the upper horizon Hs identifies the position Ps having a relative geological age V=2 as the patch 3 directly above the specific relative geological age V=2.5. In the same way, the survey identifies the lower patch 3 of position Pi having a relative geological age V=3 like the patch 3 directly below the patch 3 of position Ps. Finally, the position Pos is obtained by weighted interpolation according to the formula above.

Said step of weighted interpolation makes it possible to be free of any intervention by a human operator but also to obtain geological horizons H beyond the precision of the geological pixel Px respecting the stratigraphic validity of the deposition of the geological horizons H.

The two-dimensional horizons Hb obtained are very precise, on the order of one point per geological pixel Px, and are directly formed in vector form, that is to say, in the form of a series of points connected to each other by segments.

Figure 8:
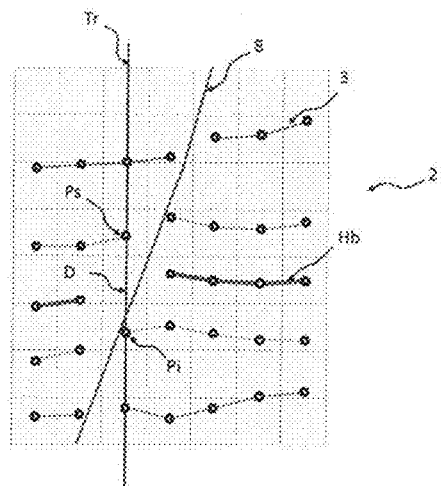
FIG. 8 is a representation of insertion of the faulting during the weighted interpolation step illustrated in FIG. 7.

In the example illustrated in FIG. 8, simultaneous with the step of weighted interpolation, faulting 8 is inserted in the network of patches 3 of the Model-Grid 2. For this purpose, a discontinuity D is generated in proximity to the fault 8 in the geological two-dimensional horizon Hb during the interpolation. Here, if a segment connecting the position Ps to the position Pi intersects a fault 8, the position Pos is not retained and a discontinuity D is generated.

Advantageously, each discontinuity D generated has similar dimensions. The insertion of the faulting 8 during the weighted interpolation is also a benefit for obtaining a Model-Grid 2 in which the geological horizons H do not intersect the faults 8.

Figure 9:
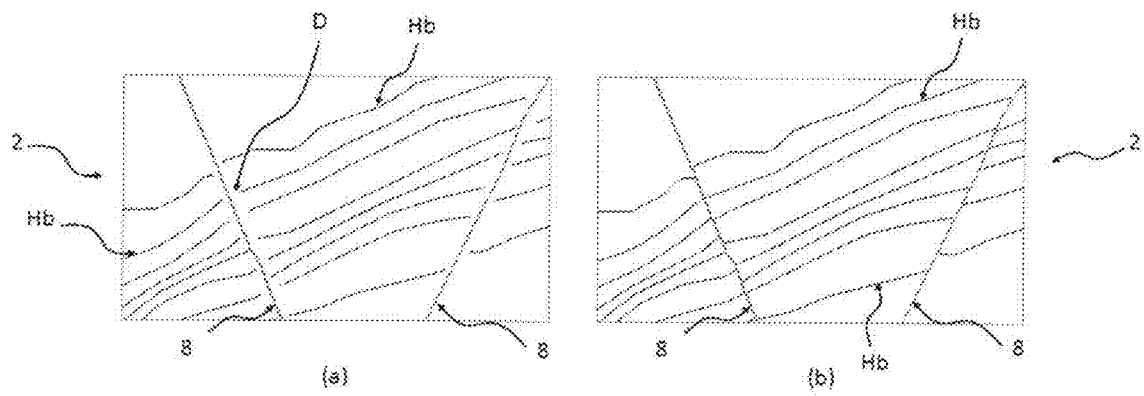
FIG. 9a is a representation of a set of horizons and faults before performing a step of automatic adjustment of the horizons/faults contacts.
FIG. 9b is a representation of the set of horizons and faults of FIG. 9a after performing the step of automatic adjustment of the horizons/faults contacts.

As illustrated in FIGS. 9a and 9b, the step of forming two-dimensional geological vector models 2DGVM comprises a step of automatic adjustment between the N geological horizons H and the faulting 8. The step of automatic adjustment consists of extending by a few geological pixels Px one end of a two-dimensional geological horizon Hb to the closest fault 8 so as to adjust the contacts between each geological two-dimensional horizon Hb and each fault 8 present in each two-dimensional geological vector model 2DGVM (illustrated in FIG. 9b). It should be noted that the technique of inserting faulting 8, and particularly the creation of discontinuities D of similar dimensions, enables a fast and completely automatic horizon H/fault 8 adjustment.

In order to generate all the two-dimensional geological vector models 2DGVM corresponding to the planes Inlines Ii and Crosslines Ci of the Model-Grid 2, the weighted interpolation and automatic adjustment steps are repeated on all the Inlines Ii and Crosslines Ci of the sampling grid G.

Each two-dimensional geological vector model 2DGVM corresponds to one Inline Ii or one Crossline Ci of the Model-Grid 2.

Figure 10:
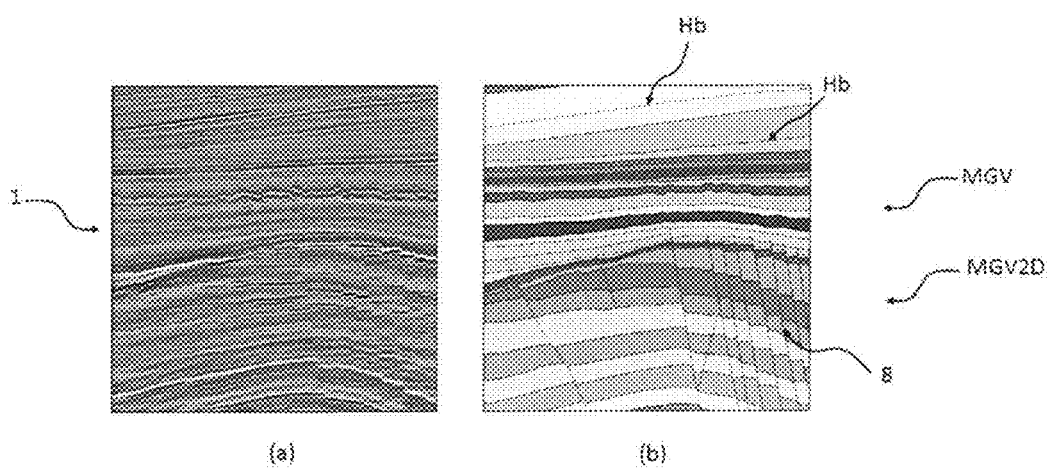

FIGS. 10a and 10b illustrate a two-dimensional geological vector model 2DGVM (FIG. 10b) obtained from an Inline Ii or a Crossline Ci of the Model-Grid 2 from seismic data 1 (FIG. 10a).

In this context, the two-dimensional geological vector model 2DGVM of FIG. 10b provides a simplified representation of the subterranean geology. Such a result provides geologists with a precise and easily interpretable tool.

Furthermore, the method of producing a geological vector model GVM also makes it possible to obtain a three-dimensional geological vector model GVM3D from seismic data 1.

The step of forming a three-dimensional geological vector model GVM3D comprises a step of forming three-dimensional geological horizons Ht that use the property of the sampling grid G to connect spatially all the two-dimensional horizons Hb of the same relative geological age V from each two-dimensional geological vector model 2DGVM.

The step of forming a three-dimensional geological vector model GVM3D comprises a step of combining N three-dimensional geological horizons Ht, assembling them to form a three-dimensional geological vector model GVM3D.

In order to generate a realistic three-dimensional geological vector model GVM3D, the N three-dimensional geological horizons Ht must be synchronized so that the stacking of N three-dimensional geological horizons Ht combined with each other forms a volumetric three-dimensional geological vector model GVM3D in which the faults 8 are modeled volumetrically and traverse volumetric three-dimensional horizons Ht.

Figure 12:
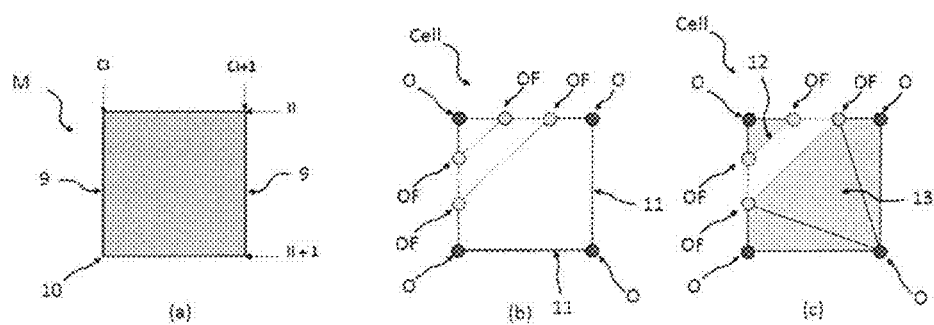
FIG. 12a is a representation of a transverse cross-section of a volumetric grid cell.
FIG. 12b is a representation of a two-dimensional cell corresponding to the intersection between a volumetric grid cell and a three-dimensional geological horizon.
FIG. 12c is a representation of a step of producing a surface fill pattern of the two-dimensional cell illustrated in FIG. 12b.

To that end, as illustrated in FIGS. 11 and 12a, the step of synchronizing N three-dimensional horizons Ht comprises a step of interconnecting the surface of each three-dimensional geological horizon Ht. For that purpose, in the sampling grid G, the intersection between two consecutive Inlines Ii and two consecutive Crosslines Ci, a function of the parameter T, makes it possible to delineate a volumetric grid cell M (illustrated in FIG. 12a). Each volumetric grid cell M comprises four sides 9, each side 9 being defined by one Crossline Ci or one Inline Ii. Here, the volumetric grid cell M is a cylindrical unit with square base that intersects the N three-dimensional geological horizons Ht (illustrated in FIG. 11).

As illustrated in FIG. 12b, the step of interconnection generates a set of remarkable points at the intersection of each volumetric grid cell M and a predetermined target three-dimensional geological horizon Ht. In this context, the intersection between a volumetric grid cell M and a three-dimensional geological horizon Ht generates two types of remarkable points, on the one hand points classified as O located on the three-dimensional geological horizon Ht, and on the other hand points classified OF located on the edge between a fault and the three-dimensional geological horizon Ht.

Except in boundary cases, the points classified as O are always located at the corners 10 of the grid cell M and the points classified as OF are located on the sides 9 of the volumetric cell M.

Indeed, it is very unlikely that a point classified as OF corresponding to the extension of the geological horizons H during the horizon H/fault 9 adjustment be located exactly at the intersection of an Inline Ii and a Crossline Ci. To manage this boundary case, the distance between the points classified as OF and the position of the closest Inline Ii or Crossline I plane is calculated. If that distance is less than a precise value epsilon, the volumetric grid cell M cannot be processed. However, the actual precision of the data processing means greatly reduces this value epsilon, resulting in this type of case becoming an exceptional phenomenon.

As illustrated in FIG. 12b, the set of remarkable points classified as O and OF located at the intersection between a volumetric grid cell M and a target three-dimensional geological horizon Ht define a two-dimensional Cell.

Figure 13:
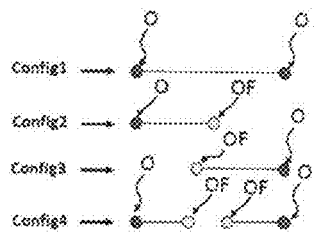
FIG. 13 is a representation of four possible configurations for filling in one side of a volumetric grid cell when it intersects a geological horizon.

As illustrated in FIG. 13, during the step of interconnecting each three-dimensional geological horizon Ht, an intersection between a three-dimensional geological horizon Ht and a volumetric grid cell M generates four possible configurations for each side 11 of a two-dimensional Cell, each side 11 of a two-dimensional Cell corresponding to one side of a volumetric grid cell M.

A first configuration config1 corresponds to a side configuration of the two-dimensional Cell defined by two remarkable points classified as O disposed at the intersection of the Inline Ii and Crossline Ci defining the volumetric grid cell M corresponding to the two-dimensional Cell. A second configuration config2 and a third configuration config3 correspond to configurations of a side 11 of the two-dimensional Cell in which a remarkable point classified as O is disposed at the intersection of the Inline Ii and Crossline Ci defining the volumetric grid cell M, while a point classified as OF is disposed on the side segment 11 of the two-dimensional Cell. A fourth configuration config4 corresponds to a configuration of side 11 of the two-dimensional Cell defined, on the one hand, by two remarkable points classified as O disposed at the intersection of Inline Ii and Crossline Ci defining the volumetric grid cell M corresponding to the two-dimensional Cell, and on the other hand, by two points classified as OF and disposed consecutively on one side of the two-dimensional Cell.

Figure 15:
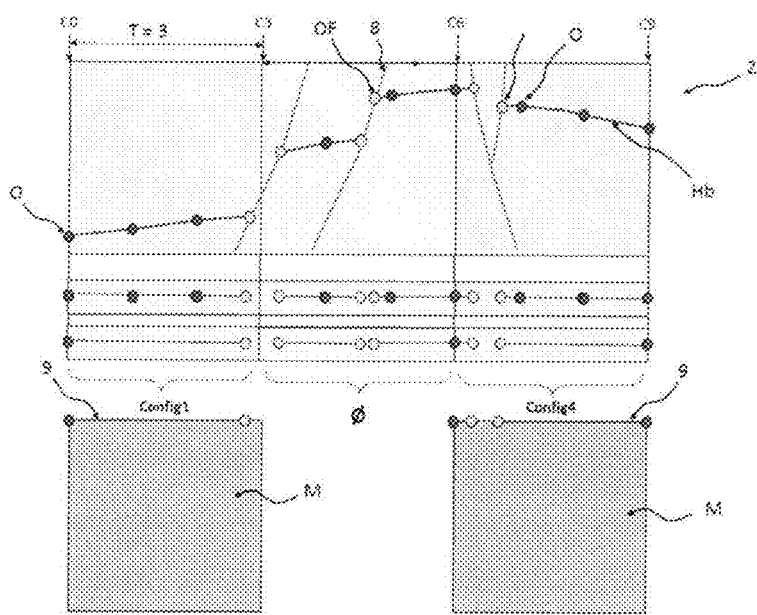
FIG. 15 is a representation of a fill of FIG. 14, of one side of a plurality of volumetric grid cells according to a parameter T=3.

In the example illustrated in FIG. 15, the step of interconnecting each three-dimensional geological horizon Ht, as a function of the sampling parameter T, remarkable points classified as O can be disposed between any two remarkable points. Said remarkable points classified as O are eliminated because they do not provide useful information in the forming of the surface fill pattern of the two-dimensional Cell. Here, in the volumetric grid cell M defined by the Crosslines C0-C3 and C6-C9, two remarkable points classified as O located between two other remarkable points are eliminated.

For a size of the sampling parameter T that is too large, we reach impossible configurations that do not correspond to any of the accepted 4 configurations. This possibility is illustrated in the example of FIG. 15 for which a sampling parameter T of value T=3 has been chosen. In this example, the side 10 of the volumetric grid cell M defined by the Crosslines C3 and C6 comprises a succession of remarkable points described below:

OF-O-OF-OF-O-O

Here, such configuration of volumetric grid cell M cannot be used since it does not form part of the possible configurations. This failure of formation of the volumetric grid cell M defined by the Crosslines C3 and C6 constitutes a local failure that does not undermine the overall formation of the geological vector model GVM.

Figure 14:
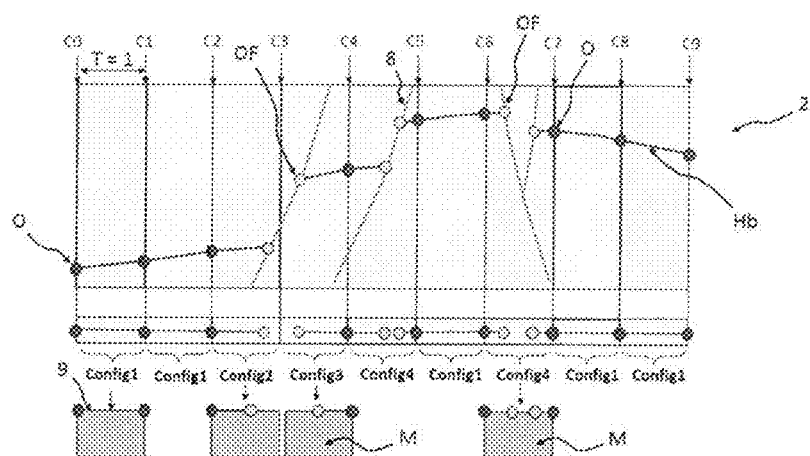
FIG. 14 is a representation of a fill of one side of a plurality of volumetric grid cells according to a parameter T=1.

As illustrated in FIG. 14, here the sampling parameter is T=1, and the sequence presented between the Crosslines C0 and C9 does not have impossible configurations. As a general rule, with T=1, 2, and even 3, the number of impossible configurations is very small. The smaller the value of T, the greater the precision of the geological vector model GVM will be.

In the example illustrated in FIGS. 12b and 12c, the step of interconnecting N three-dimensional horizons Ht comprises a step of forming a surface fill pattern of the two-dimensional Cell by identification of remarkable points classified as O and OF each side 11 of a two-dimensional Cell. The surface fill pattern makes it possible to sequence the two-dimensional Cell in fault segments 12 and in geological horizon H triangle 13.

Figure 16:
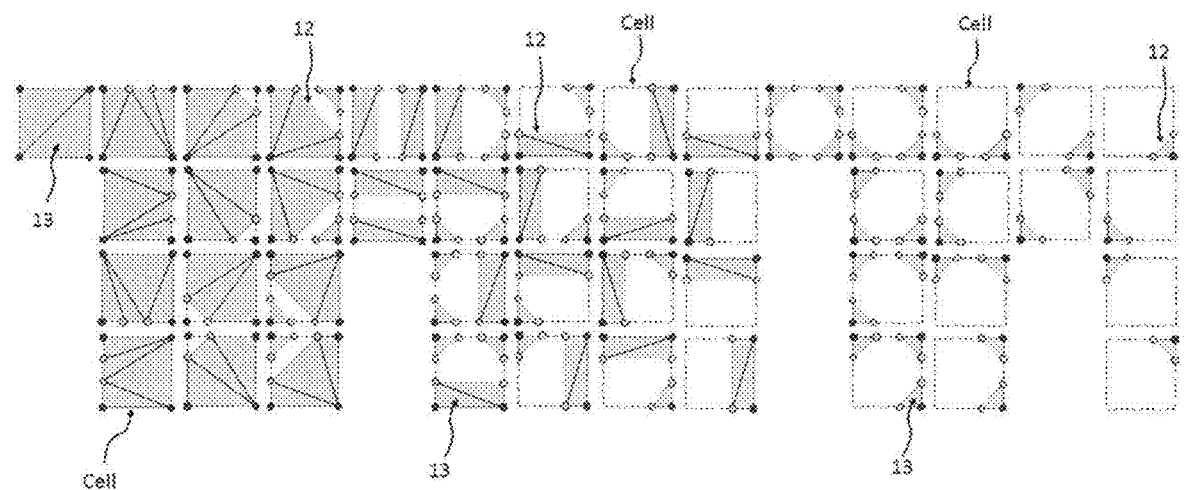
FIG. 16 is a representation of a set of possible configurations defining a two-dimensional cell.

The step of forming a surface fill pattern of the two-dimensional Cell by identification of remarkable points classified as O and OF makes it possible to obtain, by correspondence with one of 46 possible surface fill patterns illustrated in FIG. 16, the surface fill pattern of each two-dimensional cell.

Figure 17:
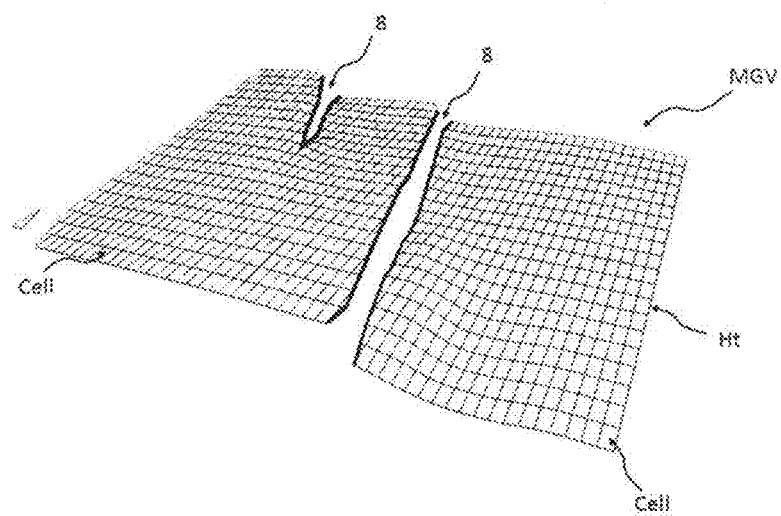
FIG. 17 is a grid cell representation of a horizon obtained by the method of the invention.

Summary of an example of algorithm of grid cell of N three-dimensional horizons Ht:

For each of the N horizons HOR of relative geological age Vn:
    Start
        For each volumetric grid cell M of the sampling grid G
            Start
            fill the two-dimensional Cell corresponding to the volumetric grid cell M according to the method described in the interconnection step.
            calculate the horizon triangles 13 and the fault segments 12 based on one of the 46 possible configurations for Cell.
        End
    End As illustrated in FIG. 17, the step of interconnection of the surface of each three-dimensional geological horizon Ht comprises a step of coordination making it possible to coordinate surface fill patterns of each two-dimensional Cell belonging to the same three-dimensional geological horizon Ht so as to ensure a continuity between each surface fill pattern of each two-dimensional Cell and obtain a complete three-dimensional geological horizon Ht.

In order to generate a realistic three-dimensional geological vector model GVM3D, the step of synchronizing N three-dimensional geological horizons Ht comprises a step of creating three-dimensional cells. To that end, two two-dimensional Cells located in the same volumetric grid cell M and which belong to two three-dimensional geological horizons Ht of consecutive relative ages are assembled in order to create a three-dimensional cell 14. To achieve the creation of the three-dimensional cell 14, the two two-dimensional cells Cell are connected by four faces F. Here, each face F corresponds to an Inline Ii or a Crossline Ci.

Figure 18:
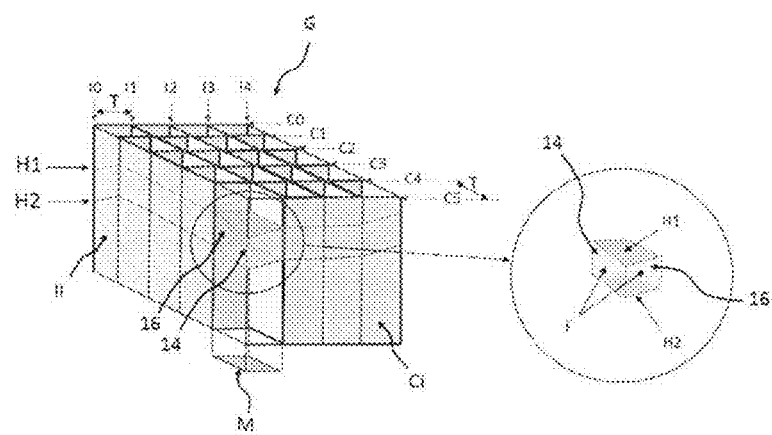
FIG. 18 is a representation of a step of producing a three-dimensional cell.

In the example of FIG. 18, a three-dimensional cell 14 is delineated by two two-dimensional Cells that belong, on the one hand, respectively to two geological horizons H1 and H2 of consecutive relative geological ages V, and on the other hand, to the same volumetric grid cell M. In this example, the surface fill pattern of each two-dimensional Cell is formed with the interconnection algorithm described above.

In order to create a realistic three-dimensional geological vector model GVM3D in which the faults 8 are fully modeled and are propagated through three-dimensional cells 14, the step of creating a three-dimensional cell 14 comprises a step of volumetric filling of each three-dimensional cell 14 by creation of a volumetric fill pattern.

Figure 19:
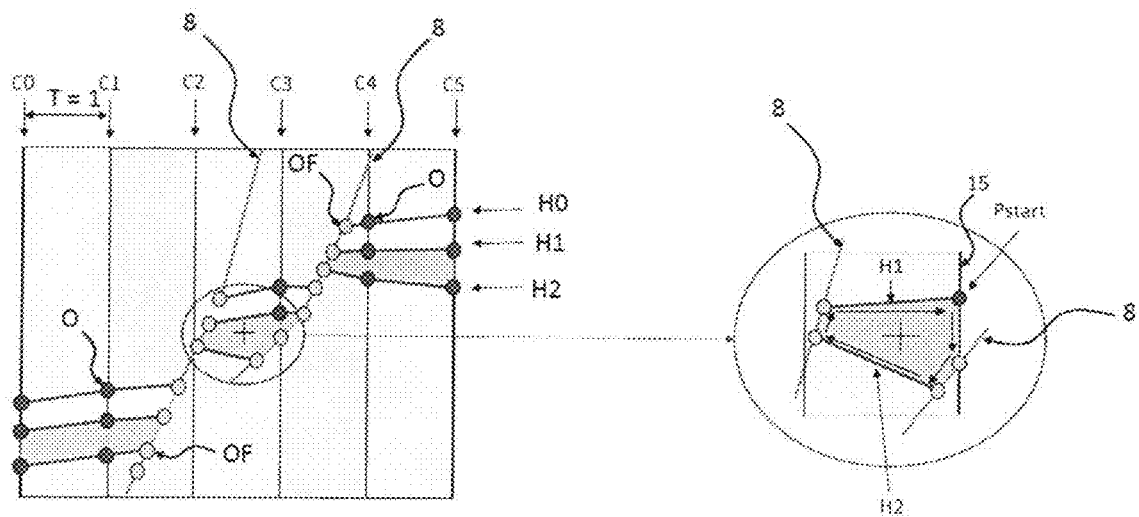
FIG. 19 is a representation of the step of identifying significant points of faces F corresponding to the lateral faces of a three-dimensional cell.

In the example illustrated in FIG. 19, the step of creating the volumetric fill pattern comprises a step of creating a lateral surface fill pattern for each lateral face F of each three-dimensional cell 14.

The step of creating the lateral surface fill pattern comprises a step of identifying complementary points located on each of the faces F thereof. The complementary points correspond to fault points located on each face F of the three-dimensional cell. The identification of a set of complementary points E is achieved by passing through each lateral face F from a remarkable starting point Pstart. This identification makes it possible to create a list L of remarkable points sorted in the direction of travel of the lateral faces F.

Example of an algorithm for identifying complementary points of a face F:

1-Find in E the first Pstart point located on the geological horizon H1. Place Pstart in L.

2-Follow the geological horizon H1 (while remaining in E) to the point H1 located either on a fault 8, or on a plane line 15 that corresponds to an intersection between an Inline Ii and a Crossline Ci. Place all the intersected points in L.

3-Follow the plane line 15 or the fault 8 to the first point of the geological horizon H2 (if on a plane line and a fault 8 is encountered, continue on the fault 8 and vice versa). Place all points intersected in L.

4-Follow the geological horizon H2 to the point of H2 located either on a plane line 15, or on a fault 8. Place all points intersected in L.

5-Follow the plane line 15 or the fault 8 to the point Pstart (which is located on H1) (if on a plane line and a fault 8 is encountered, continue on the fault 8 and vice versa). Place all points intersected in L.

In this example of an algorithm for identifying complementary points of a lateral face F, it should be noted that the paths on the geological horizons H1 and H2 are symmetrical. As a result, if the point Pstart is not found on the geological horizon H1, the start is on the geological horizon H2.

If Pstart cannot be found on geological horizons H1 and H2, identification of complementary points is impossible.

The identification of complementary points of each face F makes it possible to generate fault segments 12 and triangles 13 of horizon H enabling the internal structure 16 to be modeled of each three-dimensional cell 14 by a volumetric fill of each three-dimensional cell 14.

6-Interconnect all the points listed in L with a polygon interconnection algorithm that enables a complex (non-convex) polygon to be transformed into a set of convex polygon, for example the algorithm described in the document "R. Seidel, A simple and fast incremental randomized algorithm for computing trapezoidal decompositions and for triangulating polygons. Computational Geometry: Theory and Applications, Volume 1 Issue 1, July 1991 Pages 51-64."

Furthermore, the step of creating the volumetric fill pattern of each three-dimensional cell 14 consists of connecting the six surface fill patterns of each three-dimensional cell 14 by identification of the common points at the four lateral faces F and at the two two-dimensional Cells that compose a three-dimensional cell 14.

Figure 20:
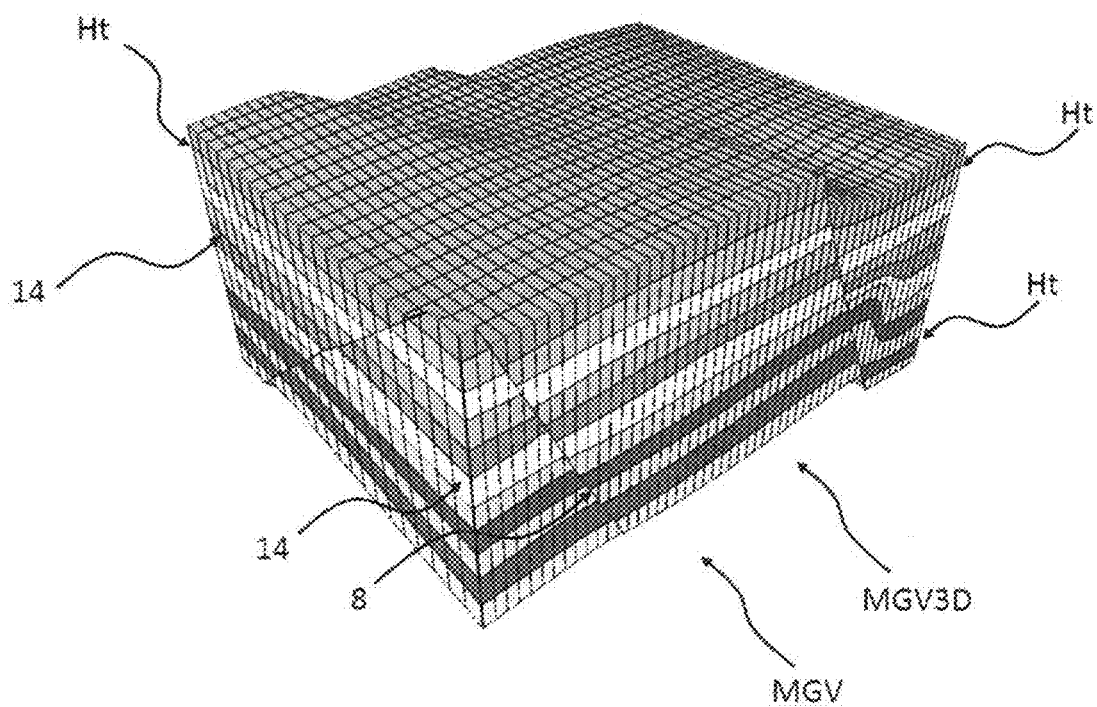
FIG. 20 is a cellular representation of a three-dimensional geological vector model obtained according to the method of the invention.

The volumetric fill of each three-dimensional cell 14 makes it possible to achieve the formation of a cellular three-dimensional geological vector model GVM3D illustrated in FIG. 20.

Advantageously, the cellular three-dimensional geological vector model GVM3D illustrated in FIG. 20 has multiple applications in the field of subterranean interpretation. For example, it is possible to model a sedimentary basin, assigning physical petroleum properties of rock to each three-dimensional cell 14 comprising the cellular three-dimensional geological vector model GVM3D. This characterization of three-dimensional cells 14 is useful for example for simulating properties of a fossil fuel reservoir (petroleum, gas, etc.).

In the context of modeling sedimentary basins, it is possible to model compressive and extensive stresses by modeling faults 8 and geological fractures. On this basis, it is possible to compensate for movements of faults 8 and flattenings of three-dimensional geological horizons Ht which take place over time, so as to restore the geology to a given time.

Another application of the cellular three-dimensional geological vector model GVM3D concerns the analysis of the intersection of three-dimensional geological horizons HT on a fault plane 8 enabling the juxtaposition to be visualized of three-dimensional geological horizons HT on either side of a fault 8. Depending on the thickness of the three-dimensional geological horizon HT and an offset of the fault 8, it is possible to identify whether the three-dimensional geological horizons located on either side of the fault 8 offset communicate through the fault 8. This makes it possible to characterize the sealing properties of fault 8 in a specific area of the reservoir.

The cellular three-dimensional geological vector model GVM3D also offers the possibility of producing an extraction of the geological horizons H adjusted to the segments of fault 12, or conversely to perform an extraction of a fault segment 12 corresponding to the points of contact between a geological horizon H and a fault 8.

By using the cellular three-dimensional geological vector model GVM3D, geologists can also identify and model stratigraphic discordance surfaces, an erosion surface or truncated geological horizons H.

We claim:

1. A method of producing a geological vector model (GVM) from seismic data the method comprising the steps of:

forming a Model-Grid, said step of forming a Model-Grid being comprised of: creating a network of small units called patches to which are assigned a relative geological age, a set of patches of the same relative geological age corresponding to a geological layer called geological horizon;

sampling the Model-Grid in two directions perpendicular to each other, enabling the Model-Grid to be sampled in a plurality of vertical planes; and forming two-dimensional geological vector models, said step of forming two-dimensional geological vector models being comprised of: forming two-dimensional horizons of distinct relative geological ages by using the patches pertaining to each sampled plane, each two-dimensional geological vector model corresponding to a vertical plane originating from the sampling of the Model-Grid.

2. The method of producing a geological vector model as claimed in claim 1, the step of sampling the Model-Grid comprises the step of:

sequencing the Model-Grid in a multitude of vertical planes according to one sampling parameter corresponding to a distance defined in geological pixels Px, the Model-Grid being sampled along two directions, an Inline direction perpendicular to a Crossline direction.

3. The method of producing a geological vector model as claimed in claim 1, further comprising the step of:

synchronizing two-dimensional geological models, wherein the step of synchronizing is comprised of connecting the two-dimensional geological horizons of the same relative geological age, belonging to each two-dimensional geological model so as to form N three-dimensional geological horizons connected to each other in order to form a three-dimensional geological vector model.

4. The method of producing a geological vector model as claimed in claim 3, further comprises the step of:

synchronizing N three-dimensional geological horizons, the step of synchronizing N three-dimensional geological horizons being comprised of the step of interconnecting each three-dimensional geological horizon through a step of creating a two-dimensional cell surface fill pattern forming the three-dimensional geological horizon.

5. The method of producing a geological vector model as claimed in claim 4, wherein the step of synchronizing N three-dimensional geological horizons comprises the step of:

creating three-dimensional cell by association of two two-dimensional cells which belong to two three-dimensional geological horizons of consecutive relative geological ages, the two two-dimensional cells being superimposed upon each other and connected by four lateral faces, each lateral face corresponding to an Inline or Crossline plane.

6. The method of producing a geological vector model as claimed in claim 4, wherein the step of synchronizing N three-dimensional geological horizons comprises the step of:

creating a lateral surface fill pattern of each lateral face.

7. The method of producing a geological vector model as claimed in claim 4, wherein the step of synchronizing N three-dimensional geological horizons comprises the step of:

creating a volumetric fill pattern of each three-dimensional cell by association of common points between the surface fill patterns of the two two-dimensional cells and the lateral surface fill patterns of each lateral face.

8. The method of producing a geological vector model as claimed in claim 1, wherein the step of forming the Model-Grid comprises the following steps:

sampling seismic data in such a way as to isolate each seismic trace;

determining a center of each patch by identification of minimums and maximums of seismic signals that comprise each seismic trace, a patch center corresponding to a small geological horizon;

a step of creating vertical and lateral links between each patch center;

laterally propagating from the center of each patch so as to form a patch network; and assigning a relative geological age to each patch by using the vertical and lateral links from each patch center.

9. The method of producing a geological vector model as claimed in claim 8, wherein the step of assigning a relative geological age is achieved by superposition and comprises the step of verifying the relative geological age, wherein the step of verifying the relative geological age is comprised of verifying, on the same seismic trace, that a higher patch does not have a higher relative geological age compared to the patch located below.

10. The method of producing a geological vector model as claimed in claim 8, wherein the step of laterally propagating from the center of each patch is comprised of associating with each patch center points of seismic data of a geological signature of which is identical to that of the center of the patch, each patch center not extending beyond a point located on a fault segment.

11. The method of producing a geological vector model as claimed in claim 1, wherein the step of forming two-dimensional geological vector models comprises the steps of:

weighted interpolating so as to create N geological horizons in which faulting is inserted;

automatically adjusting between the N geological horizons and the faulting, so as to adjust the contacts between each geological horizon and each fault present in the two-dimensional geological model; and repeating the steps of weighted interpolation interpolating and automatically adjusting in two directions perpendicular to each other so as to obtain a multitude of two-dimensional geological models by sequencing of the Model-Grid.

12. The method of producing a geological vector model as claimed in claim 11, wherein the insertion of the faulting in the network of patches of the Model-Grid is comprised of the step of generating in proximity to the fault a discontinuity in the geological horizon, each discontinuity being of similar dimensions.

13. The method of producing a geological vector model as claimed in claim 11, wherein the step of automatically adjusting between the N geological horizons and the faulting is comprised of extending by several geological pixels one end of a geological horizon to the closest fault.

14. The method of producing a geological vector model as claimed in claim 11, wherein the step of weighted interpolating so as to create geological horizons has a precision beyond the geological pixel, the weighted interpolation of the positions corresponding to a relative geological age by using the faulting as constraint.

* * * * *